United States Patent
Stasiewicz et al.

(10) Patent No.: US 10,022,811 B2
(45) Date of Patent: Jul. 17, 2018

(54) DUST COLLECTION SYSTEM FOR A TABLE SAW

(75) Inventors: Paul H. Stasiewicz, Oregon City, OR (US); John P. Nenadic, Camas, WA (US)

(73) Assignee: SawStop Holding LLC, Tualatin, OR (US)

( * ) Notice: Subject to any disclaimer, the term of this patent is extended or adjusted under 35 U.S.C. 154(b) by 289 days.

(21) Appl. No.: 12/804,684

(22) Filed: Jul. 26, 2010

(65) Prior Publication Data

US 2011/0023674 A1 Feb. 3, 2011

Related U.S. Application Data

(60) Provisional application No. 61/273,204, filed on Jul. 31, 2009.

(51) Int. Cl.
*B23D 47/02* (2006.01)
*B23D 59/00* (2006.01)
*B26D 7/18* (2006.01)

(52) U.S. Cl.
CPC ......... *B23D 47/025* (2013.01); *B23D 59/006* (2013.01); *B26D 7/1863* (2013.01); *Y10T 83/2098* (2015.04); *Y10T 83/7726* (2015.04); *Y10T 83/95* (2015.04)

(58) Field of Classification Search
CPC .............................. B27G 19/04; B23Q 11/0046
USPC .............. 83/168, 477.2, 100, 471.2; 30/391; 144/252.1
See application file for complete search history.

(56) References Cited

U.S. PATENT DOCUMENTS

| | | | |
|---|---|---|---|
| 1,552,665 A | | 9/1925 | Herschel |
| 2,044,481 A | | 6/1936 | Manley |
| 2,054,932 A | * | 9/1936 | Fleming ........................ 451/456 |
| RE20,687 E | | 4/1938 | Grozier |
| 2,236,232 A | | 3/1941 | Brescka |
| 2,711,061 A | | 6/1955 | Fegert |
| 2,984,268 A | * | 5/1961 | Vuichard ........................ 83/68 |
| 3,007,501 A | | 11/1961 | Mundell |
| 3,444,670 A | | 5/1969 | Hungate |
| 4,063,478 A | | 12/1977 | Stuy |
| 4,241,505 A | | 12/1980 | Bodycomb et al. |
| 4,255,995 A | | 3/1981 | Connor |
| 4,326,864 A | | 4/1982 | Sittler |

(Continued)

FOREIGN PATENT DOCUMENTS

| | | |
|---|---|---|
| DE | 4205965 C1 | 2/1992 |
| DE | 4424615 A1 | 1/1996 |

(Continued)

OTHER PUBLICATIONS

SI16WA-WF Circular Saw with Tilting Blade Spare Parts Catalogue, SCMI Corporation, Norcross, GA, Nov. 1986 and 1991.

(Continued)

*Primary Examiner* — Andrea Wellington
*Assistant Examiner* — Fernando Ayala

(57) ABSTRACT

A dust collection system designed for a table saw is disclosed. The dust collection system includes a dust shroud and dust shield to channel dust generated by a blade as it cuts wood or other material. The dust shroud includes fins and walls to "peel" dust and air off a spinning blade and direct the dust and air downward. The dust shroud encloses the lower front portion of a blade.

17 Claims, 10 Drawing Sheets

(56) References Cited

U.S. PATENT DOCUMENTS

| | | | |
|---|---|---|---|
| 4,367,665 A | | 1/1983 | Terpstra et al. |
| 4,385,539 A | | 5/1983 | Meyerhoefer et al. |
| 4,576,072 A | | 3/1986 | Terpstra et al. |
| 4,721,023 A | * | 1/1988 | Bartlett et al. .................. 83/100 |
| 4,742,743 A | | 5/1988 | Scrapone |
| 4,875,398 A | | 10/1989 | Taylor et al. |
| 5,033,192 A | * | 7/1991 | Franz et al. .................... 30/124 |
| 5,123,317 A | | 6/1992 | Barnes, Jr. et al. |
| 5,158,001 A | | 10/1992 | Udelhofen et al. |
| 5,181,447 A | | 1/1993 | Hewitt |
| 5,231,906 A | | 8/1993 | Kogej |
| 5,537,748 A | * | 7/1996 | Takahashi et al. ............. 30/124 |
| 5,588,213 A | | 12/1996 | Swanberg |
| 5,675,895 A | * | 10/1997 | Mori et al. ..................... 30/124 |
| 5,857,507 A | | 1/1999 | Puzio et al. |
| 6,009,782 A | | 1/2000 | Tajima et al. |
| 6,058,819 A | * | 5/2000 | Binder et al. ................... 83/168 |
| 6,131,629 A | | 10/2000 | Puzio et al. |
| 6,139,411 A | * | 10/2000 | Everts et al. .................. 451/359 |
| 6,370,997 B1 | | 4/2002 | Rugen et al. |
| 6,422,116 B1 | * | 7/2002 | Kenyon et al. ............. 83/477.2 |
| 6,470,778 B1 | | 10/2002 | Kaye, Jr. et al. |
| 6,510,772 B2 | * | 1/2003 | Brickner et al. ................ 83/100 |
| 6,530,303 B1 | * | 3/2003 | Parks et al. ..................... 83/473 |
| 6,736,042 B2 | | 5/2004 | Behne et al. |
| 6,796,208 B1 | * | 9/2004 | Jorgensen ........................ 83/100 |
| 6,966,350 B1 | | 11/2005 | Gist |
| 7,241,211 B2 | * | 7/2007 | Baratta .......................... 451/455 |
| 7,721,633 B2 | * | 5/2010 | Gaw ............................ 83/471.3 |
| 7,980,163 B2 | * | 7/2011 | Meredith et al. ............... 83/478 |
| 2007/0157784 A1 | * | 7/2007 | Gass et al. ...................... 83/581 |
| 2009/0183377 A1 | * | 7/2009 | Loveless .............. B23D 59/006 30/390 |
| 2010/0269353 A1 | * | 10/2010 | Martin ................. B23D 59/006 30/124 |
| 2010/0307308 A1 | * | 12/2010 | Butler ............................ 83/100 |
| 2011/0179923 A1 | * | 7/2011 | Tsuda et al. .................... 83/100 |
| 2012/0036972 A1 | * | 2/2012 | Frolov ............................ 83/168 |
| 2012/0090440 A1 | * | 4/2012 | Koegel et al. .................. 83/100 |

FOREIGN PATENT DOCUMENTS

| | | |
|---|---|---|
| DE | 202004004463 U1 | 8/2004 |
| WO | WO 2004/045814 A1 | 6/2004 |

OTHER PUBLICATIONS

Inca 2100SE Professional Tablesaw Owners Manual, Injecta Machinery, 1992.
Inca 2200 Table Saw Photo of Internal Mechanisms, around 1992.
SI3200/3800 Circular with Tilting Blade Spare Parts Catalogue, SCM, Dec. 23, 1998.
SI320 Circular with Tilting Blade Spare Parts Catalogue, SCM, Dec. 23, 1998.
SI300N Circular with Tilting Blade Spare Parts Catalogue, SCM, Jun. 12, 2000.
Bosch Model 4000 Worksite Table Saw Operating/Safety Instructions, S-B Power Tool Company, Jul. 2000.
SI400N Circular with Tilting Blade Spare Parts Catalogue, SCM, Sep. 19, 2000.
Ryobi 10" Table Saw BT3000 Operator's Manual, Ryobi Technologies, Inc., Mar. 2001.
SI450E Circular with Tilting Blade Spare Parts Catalogue, SCM, Apr. 26, 2001.
Bosch 10" Table Saw Model 0601476139 Parts List and Technical Bulletin, S-B Power Tool Company, Apr. 2001.
Ryobi 10" Table Saw BT3100 Operator's Manual, Ryobi Technologies, Inc., Aug. 2002.
Rojek Circular Saw PK 300 Spare part catalogue, Apr. 14, 2003.
Porter-Cable Double Insulated 10" Bench Top Table Saw Instruction Manual, Porter-Cable Corporation, Sep. 15, 2003.
SI300S-S1300S4 Circular with Tilting Blade Spare Parts Catalogue, SCM, Oct. 30, 2003.
Powermatic WMH Tool Group Operating Instructions and Parts Manual 10-inch Cabinet Saw Model 2000, Nov. 2005.
Makita Model 2704 Exploded Drawings and Parts List, Nov. 2005.
Porter-Cable 10" Portable Table Saw 3812, Porter-Cable Corporation, 2005.
Porter Cable 10" Portable Table Saw Model 3812 Parts List with Guard Exploded View, 2005.
Grizzly Industrial, Inc. Model G0605X/G0606X Extreme Series 12" Table Saw Owner's Manual, Grizzly Industrial, Inc., Oct. 2006.
Grizzly Industrial, Inc. Model G0651/G0652 10" Extreme Series Table Saws Owner's Manual, Grizzly Industrial, Inc., Mar. 2008.
Makita Table Saw 2704 Instruction Manual, Makita Corporation of America, date unknown.
DW745 Type 1 Table Saw Parts List, DeWalt Industrial Tool Co., 2005.
DW745 Heavy-Duty 10" Job Site Table Saw Manual, DeWalt Industrial Tool Co., 2006.
C10RB Jobsite Table Saw Manual, Hitachi Koki USA Ltd., 2006.
TS 250 Manual, Metabo, 2007.
TS 250 Circular Saw Parts List, Metabo, 2007.
Bosch 4100 Table Saw Parts List, Robert Bosch Tool Corporation, Feb. 14, 2008.
Bosch 4100 Table Saw Manual, Robert Bosch Tool Corporation, May 2008.

\* cited by examiner

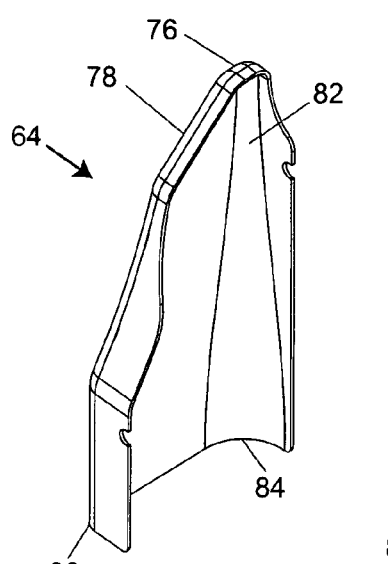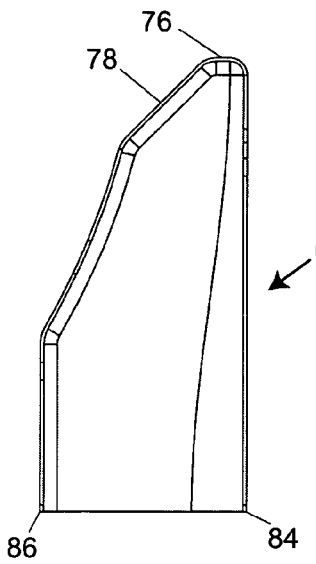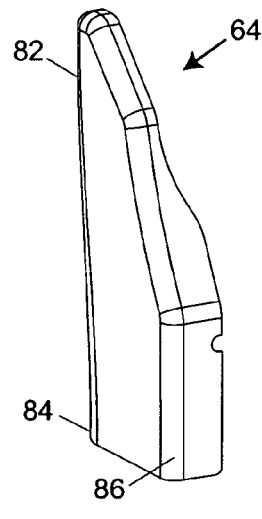
Fig. 18　　　Fig. 19　　　Fig. 20
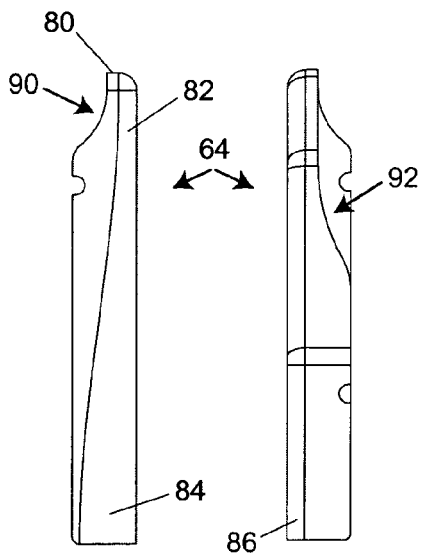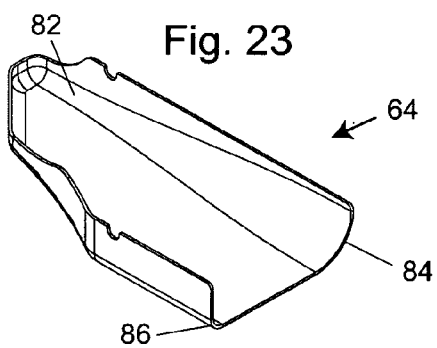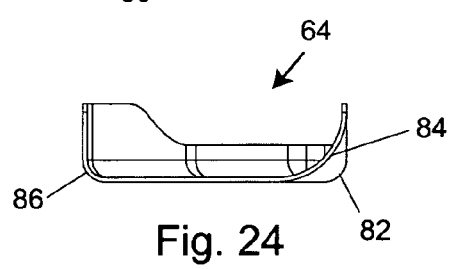
Fig. 21　Fig. 22　　Fig. 23　　Fig. 24

DUST COLLECTION SYSTEM FOR A TABLE SAW

CROSS-REFERENCE TO RELATED APPLICATION

This application claims the benefit of and priority from the following U.S. Provisional Patent Application, the disclosure of which is herein incorporated by reference: Ser. No. 61/273,204, filed Jul. 31, 2009.

TECHNICAL FIELD

The present invention relates to a dust collection system that may be incorporated in a table saw or other piece of power tool equipment.

BACKGROUND

In a workshop environment, such as a wood-working workshop, dust is routinely generated as a byproduct of operating power tools that perform cutting operations. The quantities of dust that can accumulate in and around the power tools and surrounding workspace can be considerable and it is often necessary to remove the dust to keep the machinery functioning properly and the workspace clear of interference. In addition, dust from wood and many other products commonly processed in a workshop environment have been shown to pose a health risk to those who are exposed to the dust, especially if exposed to the dust on a regular basis. Thus, it is important to limit the dust that can escape into the environment or that can accumulate in the machinery when a dust-generating power tool is in use. Enclosing the base of a power tool in a cabinet helps to trap the dust that falls below the cutting surface but it does not provide a way to keep dust from accumulating in certain interior parts of the tool and removal of the dust can be cumbersome. To address this issue, different kinds of dust collection systems have been developed. A dust collection system provides a way to collect dust generated by a power tool so that it can be contained and removed.

This document describes a dust collection system designed for a table saw.

BRIEF DESCRIPTION OF THE DRAWINGS

FIG. 18 shows a perspective view of the dust shield of FIG. 13 from the back.

FIG. 19 shows a front view of the dust shield of FIG. 13 relative to the front of the saw.

FIG. 20 shows a perspective view of the dust shield of FIG. 13 from the right.

FIG. 21 shows a left side view of the dust shield of FIG. 13 relative to the front of the saw.

FIG. 22 shows a right side view of the dust shield of FIG. 13 relative to the front of the saw.

FIG. 23 shows a perspective view of the dust shield of FIG. 13 which shows the bottom edge.

FIG. 24 shows a bottom view of the dust shield of FIG. 13.

DETAILED DESCRIPTION

Figure 1:
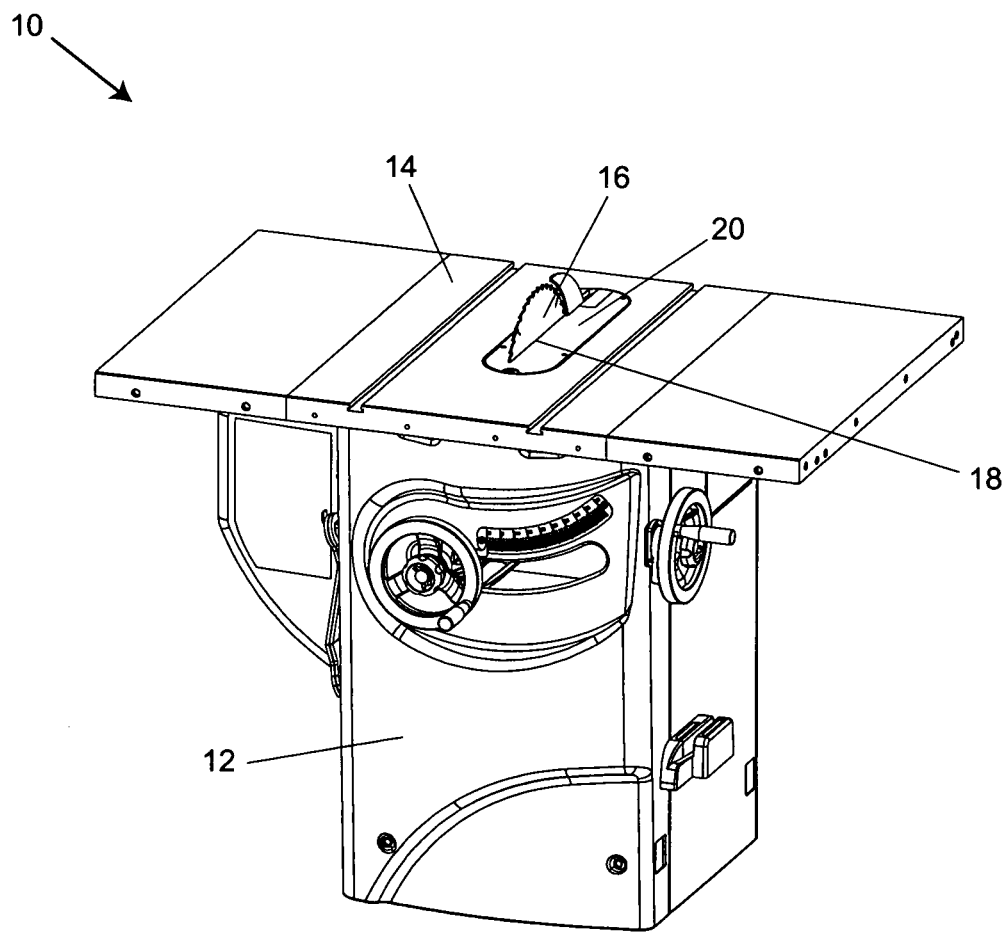
FIG. 1 shows a table saw.

A saw 10 with a cabinet base 12 is shown in FIG. 1. Saw 10 includes a table 14 and a circular blade 16 that extends up through a slot 18 in a table insert 20 that fits within an opening in the table. A piece of wood, or other material to be cut, is placed on the table and pushed into contact with the spinning blade to make a cut. Saw 10 is a type of saw called a cabinet saw. A cabinet saw typically includes an enclosed casing or cabinet which houses the motor and other parts underneath the table and forms the base of the saw.

Figure 2:
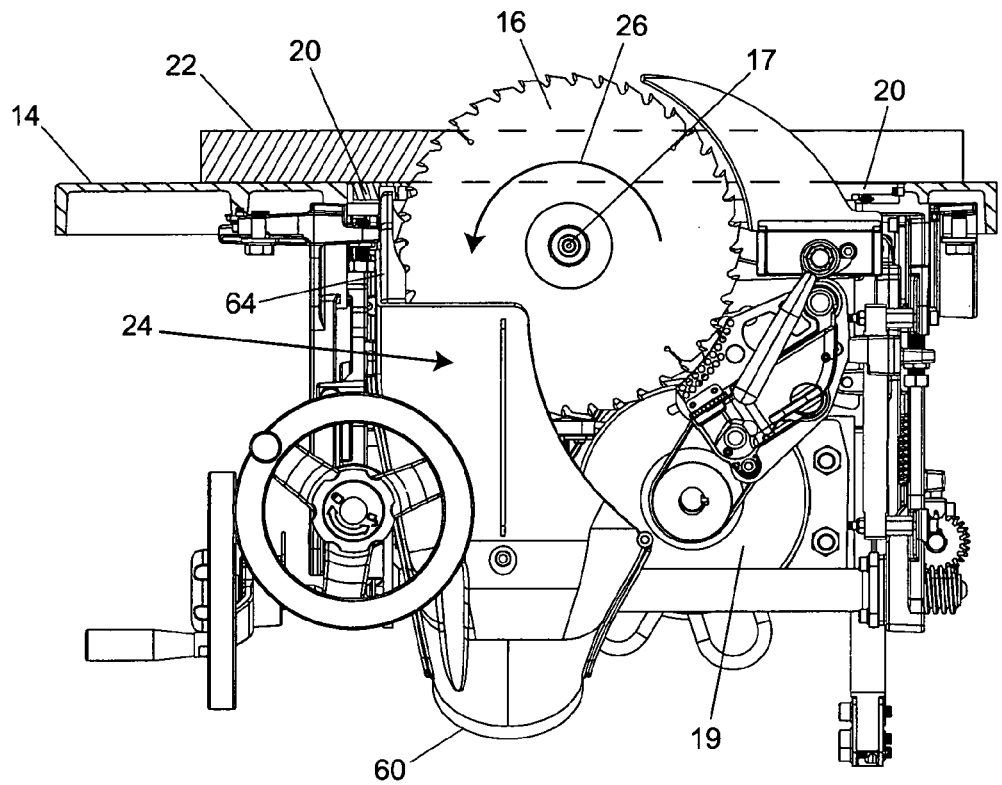
FIG. 2 shows the interior mechanism of the table saw of FIG. 1 equipped with a dust collection system and a table and work piece in cross-section.

FIG. 2 shows an interior mechanism of saw 10 designed to raise, lower and tilt blade 16 relative to table 14, with a work piece 22 on the table (the work piece and table are shown in cross-sectional view along a line adjacent the blade). The front of the saw and table is to the left in FIG. 2. Blade 16 is shown mounted on a rotatable arbor 17 driven by a motor 19 and supported by the interior mechanism. The interior mechanism is also equipped with a dust collection system 24. The dust collection system catches and channels dust generated by the blade as it cuts wood or other materials so that the dust can be captured and removed.

In a table saw, blade 16 rotates in the direction of arrow 26 so that the teeth of the blade emerge from the table at the right of FIG. 2, contact and cut a work piece on the table, and then move beneath the table at the left of FIG. 2. Blade 16 may rotate at 3,000 to 4,000 revolutions per minute, so the spinning blade creates an airflow pattern and moves air and dust particles near the blade generally along lines tangent to the direction the teeth are moving at any given instant, as shown by arrows 28 and 30 in FIG. 3. Typically, the teeth on blade 16 cut the work piece and create dust as the teeth move down from the highest point of the blade toward the table.

Figure 3:
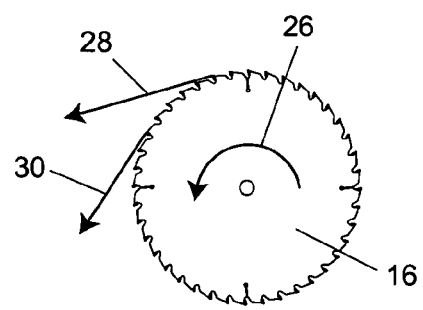
FIG. 3 shows trajectories of dust coming off the blade.

Dust created by the teeth at the front of the blade typically moves down with the teeth, generally in the direction of arrow 30 in FIG. 3. The work piece itself and the table top help direct the dust and airflow downward by surrounding the blade. Dust collection system 24 partially surrounds a front portion of the blade and is designed to capture dust particles as they are directed downward by the blade.

Figure 4:
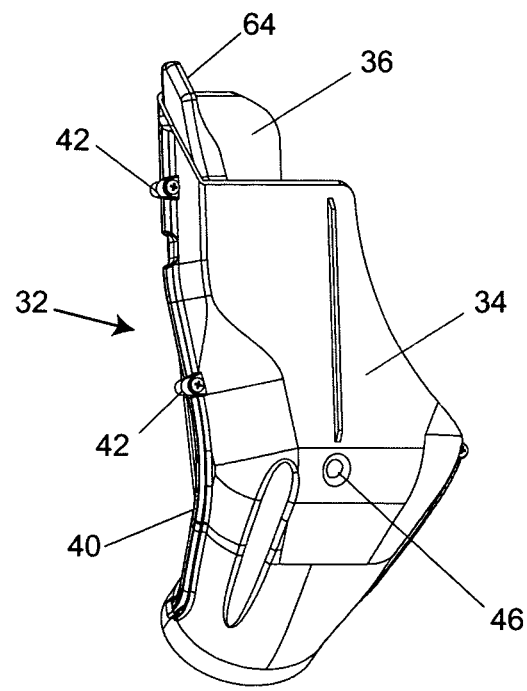
FIG. 4 shows a dust shroud used in the dust collection system of FIG. 2.
Figure 5:
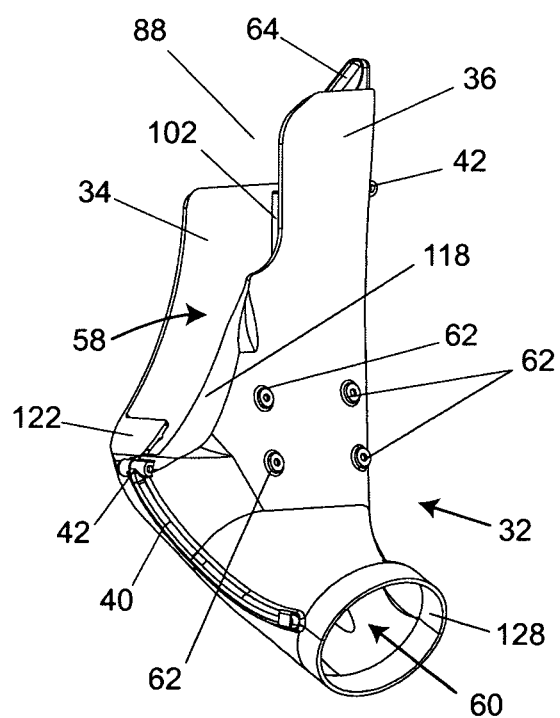
FIG. 5 shows another view of the dust shroud of FIG. 4.
Figure 6:
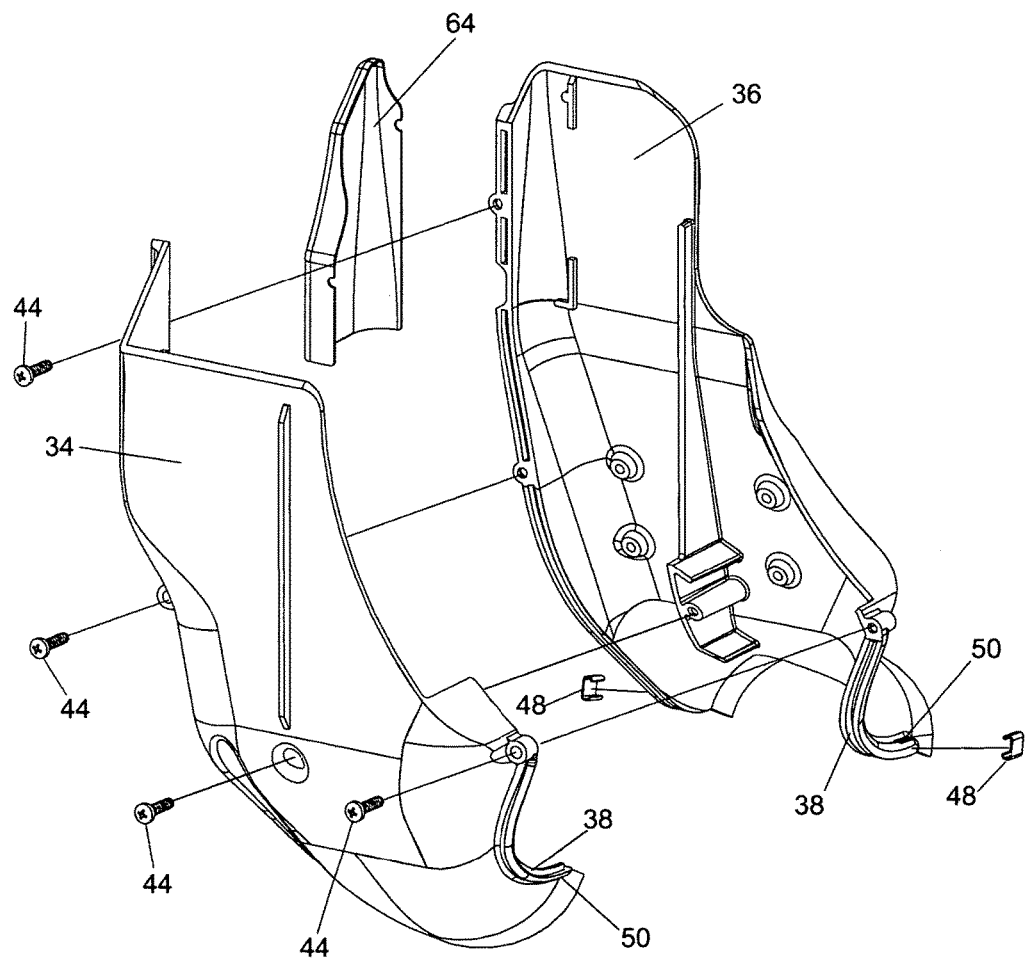
FIG. 6 shows an exploded view of the dust shroud of FIG. 4.

A main component of dust collection system 24 is dust shroud 32 shown in FIGS. 4 through 6. The dust shroud is positioned and shaped to catch dust coming off the blade and direct the dust downward where it can be collected by a vacuum system. Dust shroud 32 is composed of two halves, a right half 34 and a left half 36. In the depicted embodiment, the two halves are molded from plastic. The two halves fit together by tongue and groove edges 38 that run along the edges of each half. The tongue and groove form a tight seal between the two halves and help prevent dust from escaping the dust shroud. The tongue and groove also help with the alignment of the two halves in the assembly process. When joined, the tongue and groove form ridges 40 along the outside surface of the dust shroud and those ridges are interrupted by several non-threaded screw bosses 42. Self-threading screws 44 are threaded into the bosses to secure the two halves. In the depicted embodiment, two screws secure the upper and middle front edge and one screw secures the middle rear edge of the dust shroud. A fourth screw passes through a non-threaded sunken boss 46 generally in the center of the right half 34. Boss 46 extends into the interior of the dust shroud and includes a portion extending inward from left half 36. In the depicted embodiment, the two halves are also held together with two clips 48, as shown in FIG. 6. Clips 48 snap over or crimp around ridges 40 at the bottom of the dust shroud. Ridges 40 may include grooves 50 to accommodate the clips. Clips are used at these locations instead of screws because bosses for screws would not be in line with the direction at which the part is drawn from the mold. Other fasteners besides screws and clips could also be used.

Figure 7:
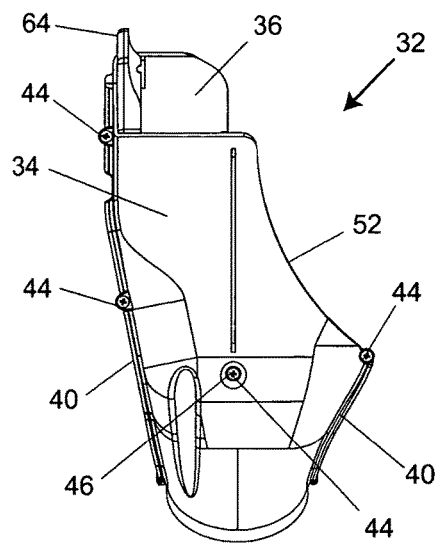
FIG. 7 shows a right side view of the dust shroud of FIG. 4 relative to the front of the saw.
Figure 8:
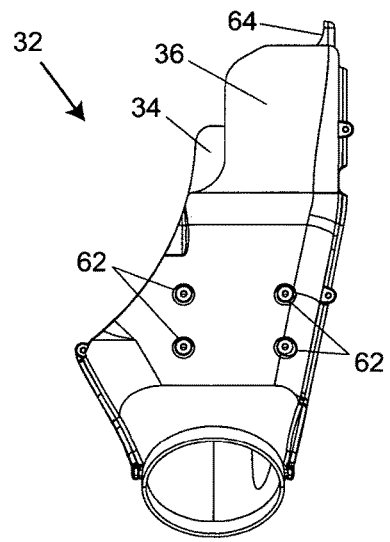
FIG. 8 shows a left side view of the dust shroud of FIG. 4 relative to the front of the saw.
Figures 9, 10:
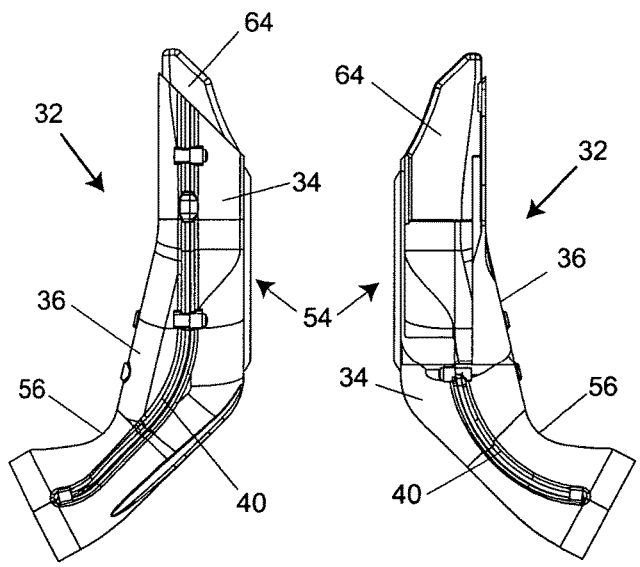
FIG. 9 shows a front view of the dust shroud of FIG. 4 relative to the front of the saw.
FIG. 10 shows a rear view of the dust shroud of FIG. 4 relative to the front of the saw.
Figure 11:
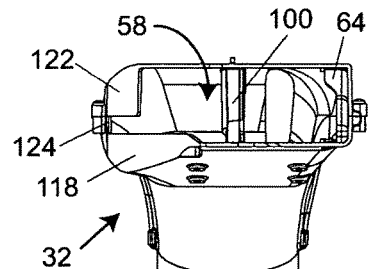
FIG. 11 shows a top view of the dust shroud of FIG. 4.
Figure 12:
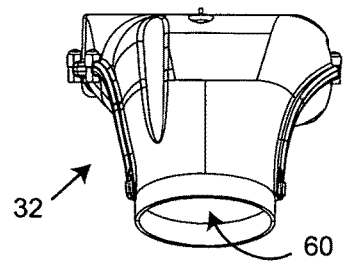
FIG. 12 shows a bottom view of the dust shroud of FIG. 4.

Various views of dust shroud 32 are shown in FIGS. 7 through 12. As shown in FIG. 7, the upper right edge of the right half of dust shroud 32 has a somewhat parabolic edge 52. That edge is mirrored on the left half along the upper left edge looking from the left, as shown in FIG. 8. From the front and rear, as shown in FIGS. 9 and 10, dust shroud 32 is generally narrow with a vertical upper section 54 and a bend 56 towards the bottom. As shown in FIG. 11, dust shroud 32 is open at the top and this upper opening 58 continues down along parabolic edge 52. As shown in FIG. 12, the bottom of the dust shroud also includes an opening 60.

Dust shroud 32 mounts in the saw by four screws that fit into four bosses 62 located towards the lower middle of left half 36, shown in FIG. 5. Screws pass from a predetermined part of the internal mechanism of the saw into the screw bosses to hold the dust shroud in place. For example, a bracket may be designed in the internal mechanism to position and hold the dust shroud in place.

Figure 13:
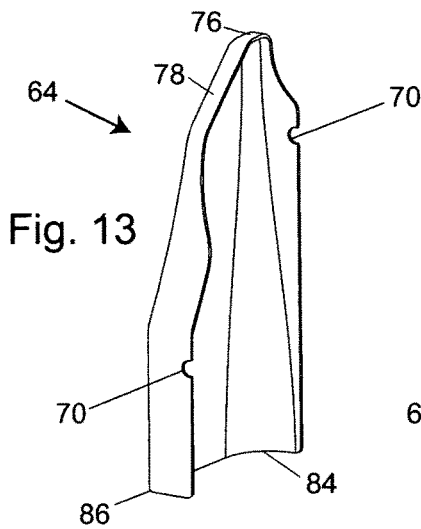
FIG. 13 shows a dust shield used in the dust shroud of FIG. 4.
Figure 15:
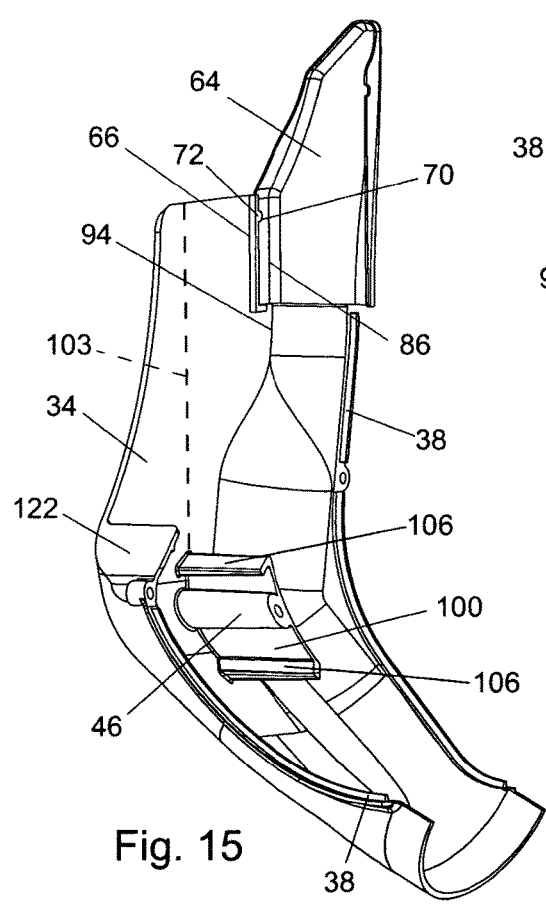
FIG. 15 shows the dust shield of FIG. 13 seated in the right half of the dust shroud.
Figure 14:
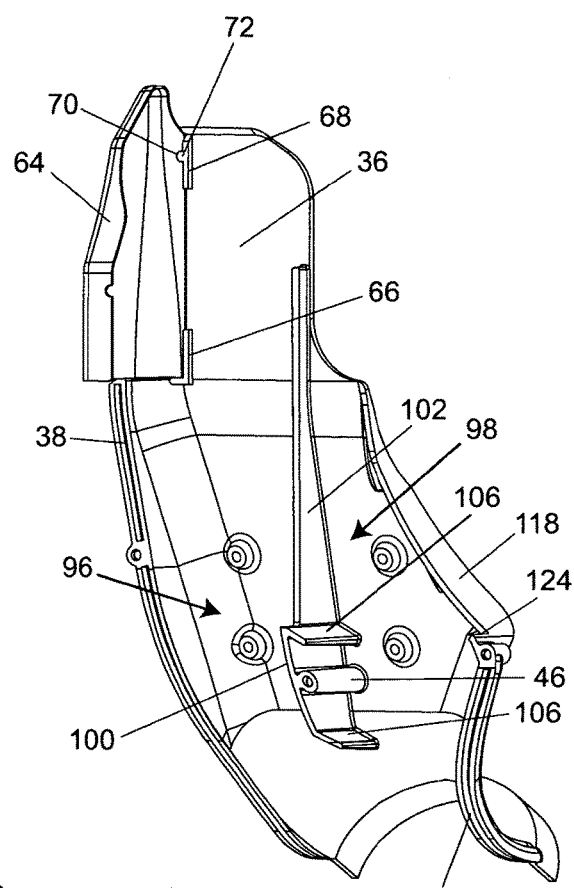
FIG. 14 shows the dust shield of FIG. 13 seated in the left half of the dust shroud.

Another important component of dust collection system 24 is dust shield 64, shown with dust shroud 32 in FIGS. 4-6 and shown isolated in FIG. 13. Dust shield 64 is a metal piece positioned at the front and top of dust shroud 32. The dust shield may be the first part of the dust collection system that dust particles moving off the blade encounter. Dust shield 64 is made of metal or some other hard material because the dust from certain kinds of materials can be very abrasive and wear through plastic or other soft materials. Dust shield 64 fits vertically along the inner front wall of dust shroud 32 and protrudes above the top of the dust shroud, as seen in at least FIG. 9. The dust shield rests on the bottom legs of L-shaped ribs 66 that are molded into each dust shroud half, as shown in FIGS. 14 and 15. The L-shaped ribs extend upwards along the sides of the dust shield and these, along with a vertical rib 68 located at the top of the left half of the dust shroud, define the area within which the dust shield is positioned. To prevent the dust shield from moving vertically upwards, rounded notches 70, one cut along the edge of each side of the dust shield, fit around semi-circular protrusions 72 that are molded along the L-shaped rib 66 on one side of the dust shield and along vertical rib 68 on the other side of the dust shield. The dust shield is somewhat dished or cupped in shape because it includes sides and a top that are curved or bent over to form a generally recessed area or concavity to help catch and direct dust into dust shroud 32. The bottom edge of the dust shield, however, is open; it is not bent or curved to form a wall because that would impede the flow of dust into dust shroud 32.

As seen in FIG. 2, dust shroud 32 and dust shield 64 are positioned below the upper surface of table 14 at the front of the blade so that the dust shroud partially encloses the forward portion of the blade. In that position, dust coming off the front of the blade is caught by the dust shield and dust shroud, especially when the blade is raised above the table a sufficient distance so that the movement of the teeth at the front of the blade is generally downward toward the table. However, when the blade is lowered so that less of the blade extends above the table, the movement of the teeth above the table is more horizontal relative to the table top and the dust coming off the blade typically moves in more of a horizontal direction toward the front of the saw rather than down into the dust shroud. If there is a gap between the top of the dust shroud and the underside of the table or table insert, then dust would move through the gap and escape.

Figure 16:
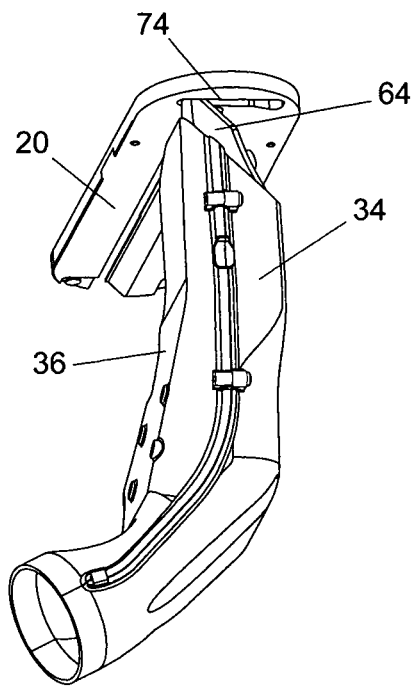
FIG. 16 shows the dust shroud of FIG. 4 with the dust shield of FIG. 13 extending up into a channel in a table insert.
Figure 17:
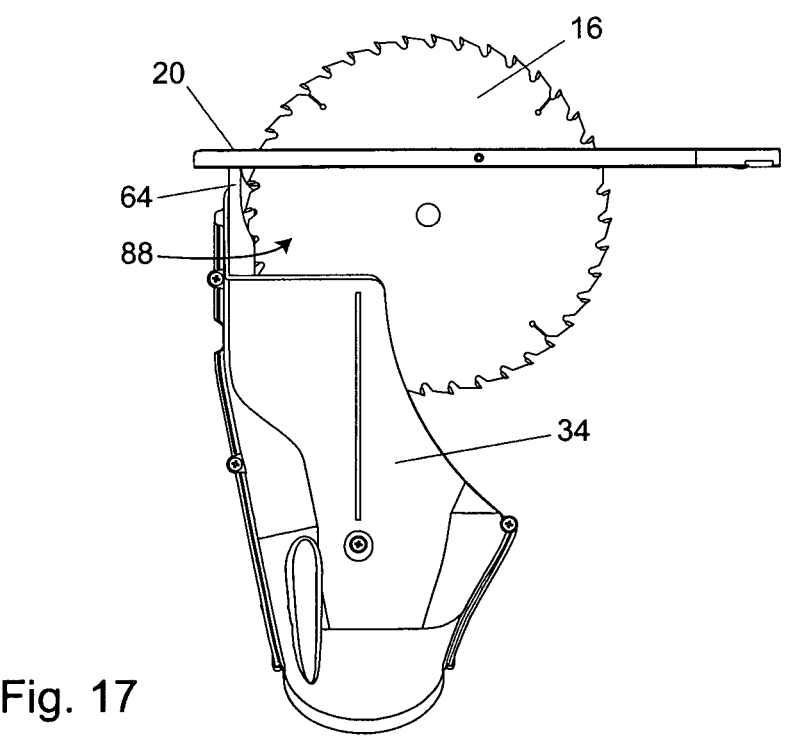
FIG. 17 shows another view of the dust shield of FIG. 13 extending up into a channel in a table insert.

To catch dust shooting off at a more horizontal angle, the top of dust shield 64 is designed to protrude up into a groove or channel 74 cut into the underside of table insert 20, as shown in FIGS. 16 and 17. In this manner, dust shield 64 and the underside of table insert 20 overlap so there is no gap between the top of the dust shield and the plane of the underside of table 14.

The blade in a table saw is allowed to tilt between 90 and 45 degrees relative to the table top in order to make miter or angled cuts. As shown in FIGS. 18 and 19, dust shield 64 has a short horizontal top portion 76 and then a sloped section 78 that slopes downward at 45 degrees. When the blade is at 90 degrees relative to the table top, the horizontal top portion 76 of the dust shield protrudes up into channel 74 in the underside of table insert 20. As the blade is tilted from 90 degrees, the dust collection system tilts as well. When the blade is tilted to 45 degrees, sloped section 78 becomes generally parallel to the bottom of table 14 and protrudes up into channel 74 to maintain the overlap with the underside of the table insert. Channel 74 is sized and shaped to allow the dust shield to tilt with the blade and still maintain the overlap.

Both the horizontal top portion and sloped section of the dust shield are cupped in such a way that the rounded corners evolve into a surface or wall 80 that extends back toward the blade, as shown in FIG. 21. Surface 80 provides what may be thought of as a shingling effect with channel 74 to help prevent dust from moving past the dust shield. Without the shingling effect, more dust particles might escape at the junction between the dust shield and the table insert even though the dust shield and table insert overlap.

As the dust and airflow from the blade strike the dust shield, the dust and air may bounce back toward the blade and create turbulence, causing some dust to escape. Surface 80 and the bowl-shaped cupping of the dust shield help prevent dust from moving past the dust shield and help direct the dust and air so that it bounces back into the downward flow of air off the blade and into the dust shroud.

The cupping shape of the dust shield is different on the right and left sides. The side wall along the left side of the dust shield extends roughly normal from the front of the dust shield, and the side wall is created with a sharp bend 82 near top portion 76. However, bend 82 changes into a less sharp curve 84 at the bottom of the dust shield, as shown in FIGS. 18, 20, 23 and 24. A sharp bend near the top, such as bend 82, better directs dust back toward the downward airflow created by the blade, especially given that the top of the side wall is above the dust shroud. A less sharp curve at the bottom, such as curve 84, can be used to match the inside curve of the dust shroud because the dust shroud itself covers the side wall and blocks dust.

The side wall along the right side of the dust shield is created from a more uniform sharp or squared bend 86 along the entire length of the side. It was found experimentally that a sharper, squarer bend works better along the right side of the dust shield. It is believed a squarer bend works better along the right side of the dust shield because the front and right half of dust shroud 32 do not extend vertically as high as the left half, leaving an open area 88 on the upper right side of the dust shroud, as seen in FIG. 17, through which dust particles can escape. (The front and right half of the dust shroud do not extend as high as the left half in order to provide clearance for the dust shroud to tilt with the blade; without that clearance the dust shroud would run into the underside of the table when the blade tilts.) A less sharp curve would allow more dust to escape over the top of the dust shroud through opening 88. This is particularly true when the blade is lowered and the dust hits the dust shield at a more horizontal angle. The sharp bend 86 of the dust shield blocks the dust better than a less sharp bend. Additionally, sharp bend 86 allows for more clearance to remove the blade off the arbor while maintaining the dust shroud as narrow as possible when viewing the dust shroud from the front of the saw.

The right and left side walls of dust shield 64 also change from a narrow profile at the top of the dust shield to a larger dimension as the walls extend downward. Specifically, the left side wall is shown in FIG. 21 to include a transition region 90 where the side wall becomes larger. Similarly, FIG. 22 shows a transition region 92 where the right side wall becomes larger. Generally, larger side walls are better to block dust; however, the top of the dust shield includes smaller side walls to better fit into channel 74 in the table insert. Channel 74 would have to be larger to accommodate bigger side walls, and a bigger channel could interfere with the blade or the slot in the table insert through which the blade passes. Accordingly, the depicted embodiment includes side walls that increase in size as they extend down.

Air and dust particles that hit dust shield 64 are redirected downward into the dust shroud 32. Like the dust shield, the dust shroud is also squared in the corner along the side of and just below opening 88 as shown at 94 in FIG. 15. This redirects dust downward that would otherwise follow the curvature of a curved corner and escape through opening 88.

Dust shroud 32 has two channels in its interior, a front or primary channel 96 and a rear or secondary channel 98. The two channels are partially separated by a barrier formed by a lower fin 100 and a side fin 102, as shown in FIGS. 14 and 15. When the dust shroud is positioned in the saw, blade 16 is above lower fin 100 and to the right of side fin 102 when looking at the blade from the front of the saw. The front channel catches fast moving air from the blade, and the lower and side fins "peel" or direct the air and dust particles off the rotating blade as it passes by because of their proximity to the blade.

Figure 26:
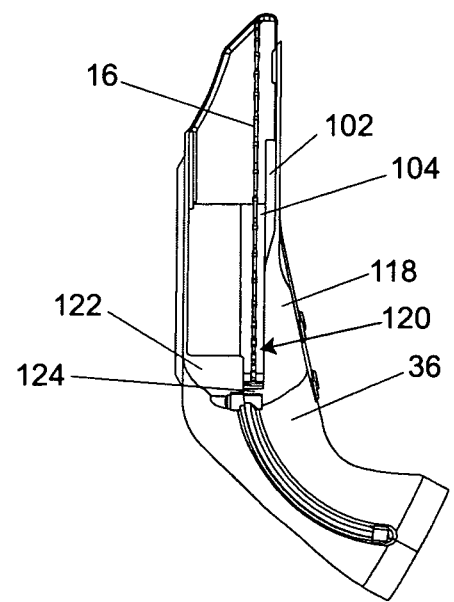
FIG. 26 shows a rear view of the blade seated in a lowered position in the dust shroud.
Figure 27:
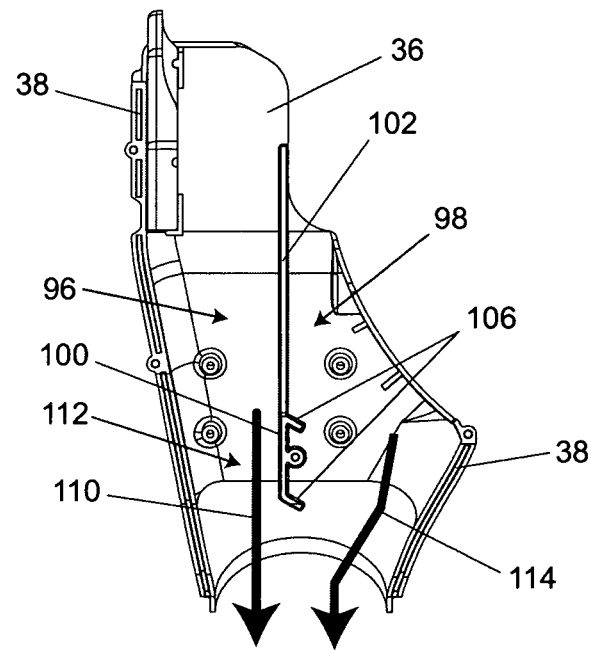
FIG. 27 shows the flow of air through the left half of the dust shroud of FIG. 4.

Side fin 102 consists of a wall-like projection that is perpendicular to and runs generally vertically along the inner wall of the left half of the dust shroud, as best seen in FIGS. 6 and 27. The side fin extends from the dust shroud towards the blade and fills in the area between the blade and the dust shroud along the length of the blade leaving only a small gap 104 between it and the blade, as shown in FIG. 26. Generally, side fin 102 should be as close to the blade as possible and generally within 2 to 10 millimeters from the side of the blade. Side fin 102 is long enough to run along the blade when the blade is in both its raised and lowered positions. A side fin could extend from the right half of the dust shroud as well so that the blade is surrounded on both sides, as indicated by dashed line 103 in FIG. 15. The additional side fin could be configured like fin 102, but typically would have a larger side-to-side dimension in order to be closer to the blade to peel dust and air from the blade. The additional side fin also could be configured as a removable fin so that it could be removed when necessary, such as to accommodate thicker blade stacks, such as dado stacks, and/or blade removal. In the depicted embodiment, no side fin extends from the right half of the dust shroud in order to leave room for thicker blade sets and to facilitate blade removal.

Figure 25:
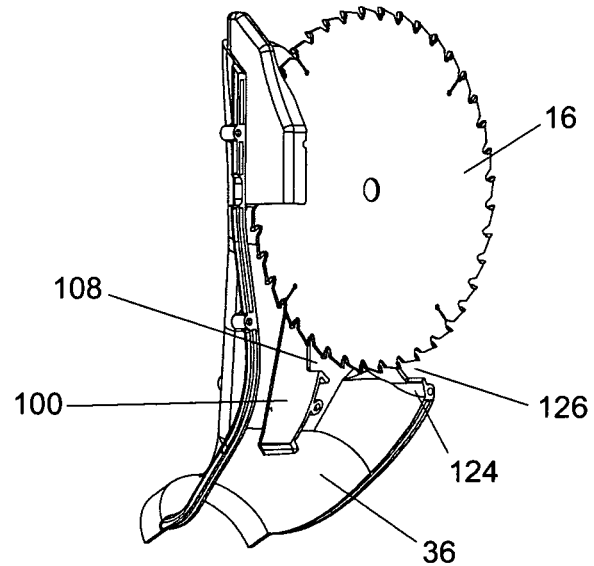
FIG. 25 shows the blade seated in a lowered position in the left half of the dust shroud.

Lower fin 100 is a relatively short and generally vertically oriented wall located in the lower part of dust shroud 32. The lower fin is situated below the perimeter of the blade where it is most effective in peeling air and dust particles off the rotating blade, and lower fin 100 is closest to the blade when the blade is lowered so that only a small gap 108 is left between the lower fin and the teeth of the blade, as shown in FIG. 25. As with the side fin, the lower fin should be as close to the perimeter of the blade as possible when the blade is fully lowered and generally within 5 to 15 millimeters from the edge of the blade. Lower fin 100 extends across the dust shroud from one side to the other, thereby separating the front and rear channels within the dust shroud, as shown in FIGS. 14 and 15. As seen in FIGS. 14, 15, 27 and 28, lower fin 100 has slanted surfaces 106, one at the top and another at the bottom. Those surfaces provide rigidity and strength to lower fin 100, and surfaces 106 slope downward so that dust does not collect on them. In forming the front channel, the side and lower fins may be thought of as constricting the airway at least partially so that the air coming off the blade may increase in speed through a venturi effect. In any event, by peeling the fast moving air off the blade and directing it downwards the fins help create a powerfully blowing airstream that passes through and out the lower part of the dust shroud.

Rear or secondary channel 98 provides an additional or second layer of dust removal capability. The fast moving air channeled through the front channel, as shown by arrow 110 in FIGS. 27 and 28, creates a region 112 of low pressure in front of lower fin 100 relative to the region in the rear channel behind the lower fin. Consequently, air and dust within the rear channel is drawn into the stream of fast moving air in the front channel, especially as the air in the front channel passes lower fin 100, as shown by arrow 114 in FIGS. 27 and 28.

Figure 28:
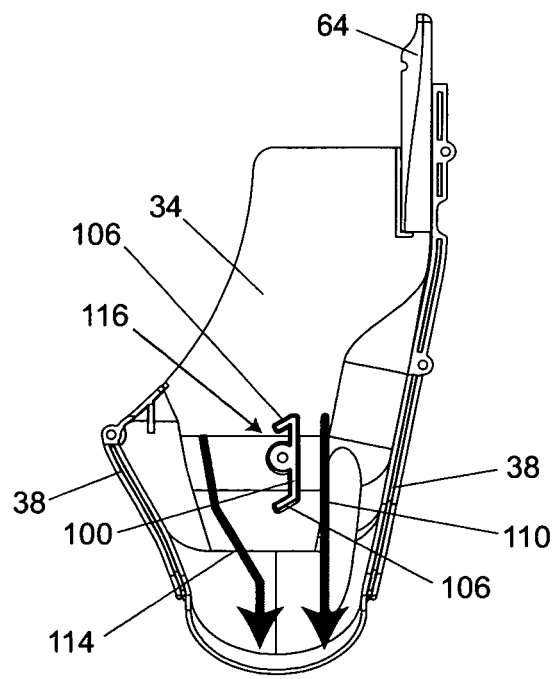
FIG. 28 shows the flow of air through the right half of the dust shroud of FIG. 4.

Some air and dust from the blade will follow the movement of the blade and move horizontally into contact with lower fin 100. The lower fin will block that air and direct it downward. This is part of what was referred to previously as "peeling" air off the blade. As that horizontal airstream hits the lower fin 100, a local eddy or low pressure region 116 forms on the upper backside of the lower fin and that eddy can catch dust moving past the fin. The dust caught by the eddy eventually falls downward and is drawn into the stream of fast moving air in the front channel. Experiments have shown that the front surface of lower fin 100 should be positioned substantially vertical in order to maximize this effect, or in other words, generally perpendicular to the horizontal airstream, as shown in FIGS. 11, 27 and 28. Additional fins may be positioned within the air channels to create additional eddies or to further direct air and dust downward.

The rear channel also has rear walls and a bottom flange to peel the air and dust particles off the blade as the blade exits the dust shroud. As shown in FIGS. 11, 14 and 26, a left rear wall 118 (left with respect to the front of the saw) extends toward the blade from the left half 36 of the dust shroud. Left rear wall 118 slopes downward and is perpendicular to the blade, leaving only a small gap 120 between it and the blade. The left rear wall should be as close to the side of the blade as possible and generally within 2 to 10 millimeters from the side of the blade. Similarly, a right rear wall 122, shown in FIGS. 11, 15 and 26, extends toward the blade from right half 34 of the dust shroud and is as close to the blade as practical, generally within 2 to 10 millimeters. The right rear wall does not extend up the dust shroud as far as the left rear wall in order to provide clearance for a stack of smaller diameter blades, such as an 8 inch diameter dado set. The left and right rear walls create what may be thought of as a slot through which the teeth on the blade may emerge from the dust shroud. A bottom flange 124 also extends from the left half of the dust shroud adjacent and just below where the edge of the blade exits the dust shroud, as shown in FIGS. 11, 14, 25 and 26. Only a small gap 126 is left between bottom flange 124 and the edge of the blade, generally on the order of 5 to 15 millimeters from the perimeter of the blade.

The dust shroud is sized from front-to-back to be sufficient to catch dust, but experiments have shown that little is gained if the dust shroud were to extend substantially beyond the front lower portion or lower front quadrant of the blade. Extending the dust shroud rearwardly beyond the center or midpoint of the blade (or beyond the arbor) to substantially cover the lower rear quadrant of the blade is not necessary because the disclosed dust shroud is able to "peel" air and dust off the blade. Covering the blade only partially allows for a more compact dust shroud, thereby permitting more easy access to the blade and other parts of the saw near the blade. Also, the side-to-side width of the dust shroud is set wide enough to accommodate a set of dado blades and effectively catch dust by trapping and channeling the air near the side surfaces of the blade or dado set while not interfering with other parts of the saw.

The main body of the dust shroud sits vertically in the saw, although in the embodiment shown the dust shroud includes a bend 56 towards its lower end. The bend allows the dust shroud to fit around other parts that may be in a saw, but is not otherwise necessary.

As shown in FIG. 5, the lower portion of the dust shroud includes an opening 60 through which the dust and air exits the dust shroud. Opening 60 may also be referred to as an exit port. As shown in FIG. 2, opening 60 is positioned substantially if not completely between the front of the saw and the blade center, and not rearward of the rear or back edge of the blade. The position of opening 60 allows the downward airflow in the shroud to easily exit the shroud. Opening 60 is bounded by a flange 128 and a flexible hose can be positioned over the flange to connect the dust shroud with a vacuum port in the saw cabinet. A user may then connect a vacuum system to the vacuum port to collect dust captured by the dust shroud and dust shield.

INDUSTRIAL APPLICABILITY

The dust collection system disclosed herein is applicable to dust-generating woodworking power tool equipment, and particularly to table saws. The described dust collection system provides a simple and effective means for channeling dust within the table saw so that the dust can be captured and later removed.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and sub-combinations of the various elements, features, functions and/or properties disclosed herein. No single feature, function, element or property of the disclosed embodiments is essential to all of the disclosed inventions.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A table saw comprising:
   a table defining a substantially horizontal work surface, where the table has a front;
   a planar, circular blade that extends at least partially above the work surface, where the blade has a perimeter with a forward-most point toward the front of the table, where the blade spins about an axis of rotation, where the blade has planar sides and where the blade moves between a fully elevated position and a fully lowered position;
   a motor to drive the blade; and
   a dust shroud that covers at least a portion of the blade beneath the table, where the dust shroud includes a front wall positioned between the front of the table and a first line extending perpendicular to the work surface and passing through the axis of rotation of the blade, a side wall with a surface adjacent the blade, and a fin extending perpendicularly out toward a planar side of the blade from the surface of the side wall, where at least a portion of the fin is between the first line and a second line extending perpendicular to the work surface and passing through the forward-most point of the blade's perimeter, and where at least a portion of the fin extends below the lowest point on the perimeter of the blade below the table with the blade in the fully elevated position.

2. The table saw of claim 1 where at least a portion of the fin is oriented vertically relative to the work surface.

3. The table saw of claim 1 where at least a portion of the fin is within 10 millimeters from a side of the blade but does not touch the blade, and within the perimeter of the blade with the blade in the fully lowered position.

4. The table saw of claim 1 where at least a portion of the fin extends within 10 millimeters from a side of the blade between the first and second lines but does not touch the blade.

5. The table saw of claim 1 where at least a portion of the fin directs airflow away from the blade.

6. The table saw of claim 1 where at least a portion of the fin below the lowest point on the perimeter of the blade is oriented vertically relative to the work surface.

7. The table saw of claim 1 where the dust shroud partially encloses a region, and where the fin at least partially separates the region into first and second channels through which dust can be collected.

8. The table saw of claim 7 where the fin establishes a region of low pressure in one channel relative to the pressure in the other channel by creating a barrier against movement from one channel to the other channel of at least a portion of an airstream.

9. The table saw of claim 1 further comprising an airway adjacent the fin, where the fin at least partially constricts the airway.

10. The table saw of claim 1 where the portion of the fin below the lowest point on the perimeter of the blade below the table with the blade in the fully elevated position directs downward at least a portion of an airstream moving horizontally along the perimeter of the blade.

11. The table saw of claim 1 where at least a portion of the fin is within 15 millimeters from the perimeter of the blade with the blade fully lowered but does not touch the blade.

12. A table saw comprising:
 a table defining a work surface, where the table has a front, and where the table has an opening;
 a planar, circular blade that extends at least partially above the work surface and that rotates about an axis of rotation;
 an insert in the opening in the table, where the insert has a thickness, a top surface substantially coplanar with the work surface, and a bottom surface above the axis of rotation;
 a motor to drive the blade; and
 a dust shroud that includes a portion positioned between the front of the table and the blade, where the portion is below the work surface, and where the portion extends into the thickness of the insert.

13. The table saw of claim 12 further comprising a channel within the thickness of the insert, where the channel has a closed top, where the channel extends towards the top surface of the insert, and where the portion extends into the channel.

14. The table saw of claim 12 where the portion is cup-shaped.

15. The table saw of claim 12 where the portion includes a substantially vertical section with a rim that turns toward the blade to create a concavity.

16. The table saw of claim 1 where the fin extends out and terminates in an edge, and where at least a portion of the edge is oriented vertically relative to the work surface.

17. The table saw of claim 1 where the fin is molded from plastic and is integral with the side wall from which it extends.

\* \* \* \* \*